(12) United States Patent
Hovgaard et al.

(10) Patent No.: US 11,391,263 B2
(45) Date of Patent: Jul. 19, 2022

(54) WIND TURBINE YAW CONTROL SYSTEM WITH IMPROVED WIND DIRECTION TRACKING

(71) Applicant: VESTAS WIND SYSTEMS A/S, Aarhus N (DK)

(72) Inventors: Tobias Gybel Hovgaard, Ry (DK); Martin Møller Sørensen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 380 days.

(21) Appl. No.: 16/617,945

(22) PCT Filed: May 31, 2018

(86) PCT No.: PCT/DK2018/050121
§ 371 (c)(1),
(2) Date: Nov. 27, 2019

(87) PCT Pub. No.: WO2018/219416
PCT Pub. Date: Dec. 6, 2018

(65) Prior Publication Data
US 2020/0102932 A1  Apr. 2, 2020

(30) Foreign Application Priority Data
May 31, 2017  (DK) ............................ PA 2017 70415

(51) Int. Cl.
*F03D 7/02* (2006.01)
*F03D 7/04* (2006.01)

(52) U.S. Cl.
CPC ........... *F03D 7/0204* (2013.01); *F03D 7/042* (2013.01); *F03D 7/045* (2013.01);
(Continued)

(58) Field of Classification Search
CPC .............................. F03D 7/0204; F03D 7/042
See application file for complete search history.

(56) References Cited

U.S. PATENT DOCUMENTS

2010/0054941 A1* 3/2010 Hoffmann ............... F03D 7/044
416/61
2011/0095537 A1  4/2011 Numajiri
(Continued)

FOREIGN PATENT DOCUMENTS

CN  103649528 A  3/2014
CN  104196680 A  12/2014
(Continued)

OTHER PUBLICATIONS

Danish Patent and Trademark Office, 1st Technical Examination including The Search Report and Written Opinion for Application PA 2017 70415 dated Nov. 23, 2017.
(Continued)

*Primary Examiner* — Mark A Connolly
(74) *Attorney, Agent, or Firm* — Patterson + Sheridan, LLP

(57) ABSTRACT

A wind turbine including yaw control comprising a controller receiving an input signal, and providing an output control signal to a yaw actuator. The input signal to the controller is based on: a first feedback signal that is indicative of the relative wind direction determined with respect to the wind turbine, wherein the first feedback signal is filtered with a first low pass filter; and a second feedback signal that is indicative of the activity of the yaw actuator. The control technique of the invention significantly improves the ability of a yaw system to maintain a zero degree yaw error during steady state wind conditions, or in other words to maintain (Continued)

an accurate heading of the nacelle pointing into the wind, as well as reducing the maximum yaw error experienced during yaw system activation.

18 Claims, 5 Drawing Sheets

(52) U.S. Cl.
CPC ... *F05B 2270/321* (2013.01); *F05B 2270/329* (2013.01); *F05B 2270/703* (2013.01)

(56) References Cited

U.S. PATENT DOCUMENTS

| | | |
|---|---|---|
| 2011/0127772 A1 | 6/2011 | Fukami et al. |
| 2011/0133453 A1* | 6/2011 | Merswolke ........... F03D 7/0276 290/44 |
| 2014/0167415 A1 | 6/2014 | Mykhaylyshyn |

FOREIGN PATENT DOCUMENTS

| | | |
|---|---|---|
| CN | 104314759 A | 1/2015 |
| EP | 2037119 A1 | 3/2009 |
| EP | 2314869 A1 | 4/2011 |
| EP | 3064770 A1 | 9/2016 |
| EP | 3112675 A1 | 1/2017 |
| WO | 2010020450 A1 | 2/2010 |
| WO | 2018219416 A1 | 12/2018 |

OTHER PUBLICATIONS

Chinese Office Action for Application No. 201880049267.6 dated Nov. 2, 2020.
PCT International Search Report for Application No. PCT/DK2018/050121 dated Aug. 21, 2018.
PCT Written Opinion of the International Searching Authority for Application No. PCT/DK2018/050121 dated Aug. 21, 2018.
European Patent Office, Communication pursuant to Article 94(3) EPC for Application 18 730224.5-1007 dated Feb. 22, 2022.

* cited by examiner

WIND TURBINE YAW CONTROL SYSTEM WITH IMPROVED WIND DIRECTION TRACKING

TECHNICAL FIELD

The present invention relates to a wind turbine yaw control system.

BACKGROUND

Modern utility scale wind turbines typically are equipped with an active yaw control system to ensure that the nacelle and the rotor face into the wind during power generation.

Common types of active yaw control systems involve the use of electric or hydraulic actuators that drive the nacelle of the wind turbine to move angularly in azimuth with respect to the tower. Typically the nacelle is mounted on the tower by a roller yaw bearing or gliding yaw bearing to allow the nacelle to yaw smoothly. A yaw braking system may also be provided to lock the nacelle at a particular azimuth position on command.

Active yaw control systems are controlled by a suitable controller which has the task of moving the nacelle to a commanded yaw position, or to maintain a zero heading with respect to the relative wind direction. Although the control theory implemented by the controller is usually quite straightforward, in practice the variable nature of the wind means that information relating to wind direction needs to be filtered to keep the activation of the yaw actuators to an acceptable level that minimizes wear. However, it has been observed that measures designed to preserve the health of the yaw control system can result in a reduced ability of the yaw system to track the wind direction accurately.

EP2314869A1 discloses a yaw control technique for a wind turbine generator that can decrease the magnitude of the wind direction deviation even though the wind direction changes gradually over an extended period of time while suppressing an increase in the number of yaw rotations. Further, it is disclosed to perform yaw rotation at an appropriate timing through early detection of transitional changes in the wind direction.

It is against this background that the invention has been devised.

SUMMARY OF THE INVENTION

In a first aspect, the invention provides a wind turbine including a nacelle mounted on a tower, and a yaw control system that is operable to yaw the nacelle with respect to the tower, the yaw control system comprising:

a controller receiving an input signal, and providing an output control signal to a yaw actuator;

wherein the yaw actuator is operable to yaw the nacelle in response to the control signal received form the controller;
  wherein the input signal to the controller is based on:
  a first feedback signal that is indicative of the relative wind direction determined with respect to the wind turbine, wherein the first feedback signal is filtered with a first low pass filter;
  a second feedback signal that is indicative of the activity of the yaw actuator, wherein the second feedback signal provides an indication of the yaw heading of the nacelle, as driven by the yaw actuator, that is not yet indicated in the in the first feedback signal due to the filtering of that signal by the low pass filter and, wherein the second feedback signal is based on a first signal component and a second signal component, wherein the first signal component represents the yaw heading of the nacelle and the second signal component is a filtered value of the yaw heading of the nacelle, the second signal component being filtered by a second filter.

The invention can also be expressed as, and therefore embraces, a control method for a wind turbine including a nacelle mounted on a tower, and a yaw system including a yaw actuator that is operable to yaw the nacelle with respect to the tower. The method comprises controlling the yaw actuator based on a low-pass filtered signal indicative of relative wind direction, and a signal indicative of the activity of the yaw actuator.

The invention also resides in a computer program product downloadable from a communication network and/or stored on a machine readable medium, comprising program code instructions for implementing a method as defined above, and a controller for a wind turbine system including a nacelle mounted on a tower, a rotor having a plurality of blades, wherein the controller includes a processor, a memory module, and an input/output system, and wherein the memory module includes a set of program code instructions which when executed by the processor, implements a method as described above.

The control technique of the invention significantly improves the ability of a yaw system to maintain a zero degree yaw error during steady state wind conditions, or in other words to maintain an accurate heading of the nacelle pointing into the wind. In addition to improving the accuracy of the yaw system during steady state conditions, the control technique also reduces the maximum yaw error experienced during yaw system activation. Furthermore, as a result of the invention the yaw actuators are activated less frequently which reduces wear on the various components of the system such as electrical contactors, gear teeth and bearing surfaces, for example.

The second feedback signal provides an indication of the yaw heading of the nacelle, as driven by the yaw actuator, that is not yet indicated in the in the first feedback signal due to the filtering of that signal by the low pass filter. Therefore, the second signal is indicative of the real time, or contemporaneous, activity of the yaw actuator such that information is fed back within the control environment about how the yaw drive actuator is operating in real time, whether that information is the specific position of the actuator at a certain point in time or information derived therefrom. However, that information is unaffected by system disturbances such as deadtime or filtering delay and so suitable adjustments can be made in the control algorithm to compensate for the filter delay inherent in the first signal by factoring in information provided by the second signal. This is compared to the significant filter delay inherent in the first feedback signal which, by virtue of needing to filter out effects of fluctuating wind conditions, is a filter having a slow time constant, for example in the order of 10s of seconds, usually greater than 50 seconds, and in this application envisaged to be between 80 and 110 second, particularly 90 seconds.

The second feedback signal is based on a first signal component and a second signal component. The first signal component may represent the yaw heading of the nacelle and the second signal component may be a filtered value of the yaw heading of the nacelle, the second signal component being filtered by a second filter. The second filter may be a low pass filter and, in some embodiments, the first filter and the second filter have substantially equal time constants.

Configuring the time constants to be substantially identical optimises the compensation achieved through the use of the second feedback signal.

In one embodiment, the controller receives a second input signal that is indicative of the relative wind direction determined with respect to the nacelle, wherein the second input signal is filtered by a further filter. The further filter may have a time constant that is different to the time constant of the first filter. In some embodiments, the further filter may have a time constant that is a fraction of the time constant of the first and second filters. For example, the further filter may have a time constant that is around 10% of the time constants of the first and second filters.

In some embodiments, the first filter may have a time constant of between 80 and 110 seconds, preferably between 90 and 100 seconds. Similarly, the second filter may have a time constant of between 80 and 110 seconds, preferably between 90 and 100 seconds.

The time constants of the first and second filters may be between 5% and 20% of the time constant of the further filter. For example, the time constant of the further filter may be between 80 and 100 seconds, and the time constant of the first filter may be between 5 and 20 seconds.

In some embodiments, the second feedback signal may be provided by monitoring the operation of the yaw actuator. However, in other embodiments, the second feedback signal is generated by a yaw actuator model. This approach is useful if it is impractical to instrument a yaw actuator with suitable monitoring equipment. It also means that the control technique is more suitable for retrofitting onto existing wind turbine system. Thus, the yaw actuator model may provide a signal that is indicative of the yaw heading of the nacelle. This can be achieved by a suitable integration function that is based on a known or predetermined yaw speed value and a control input indicating whether the actuator is deactivated or activated, together with an indication of rotational direction.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described in detail, by way of example only, with reference to the accompanying drawings, in which.

DETAILED DESCRIPTION

Specific embodiments of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
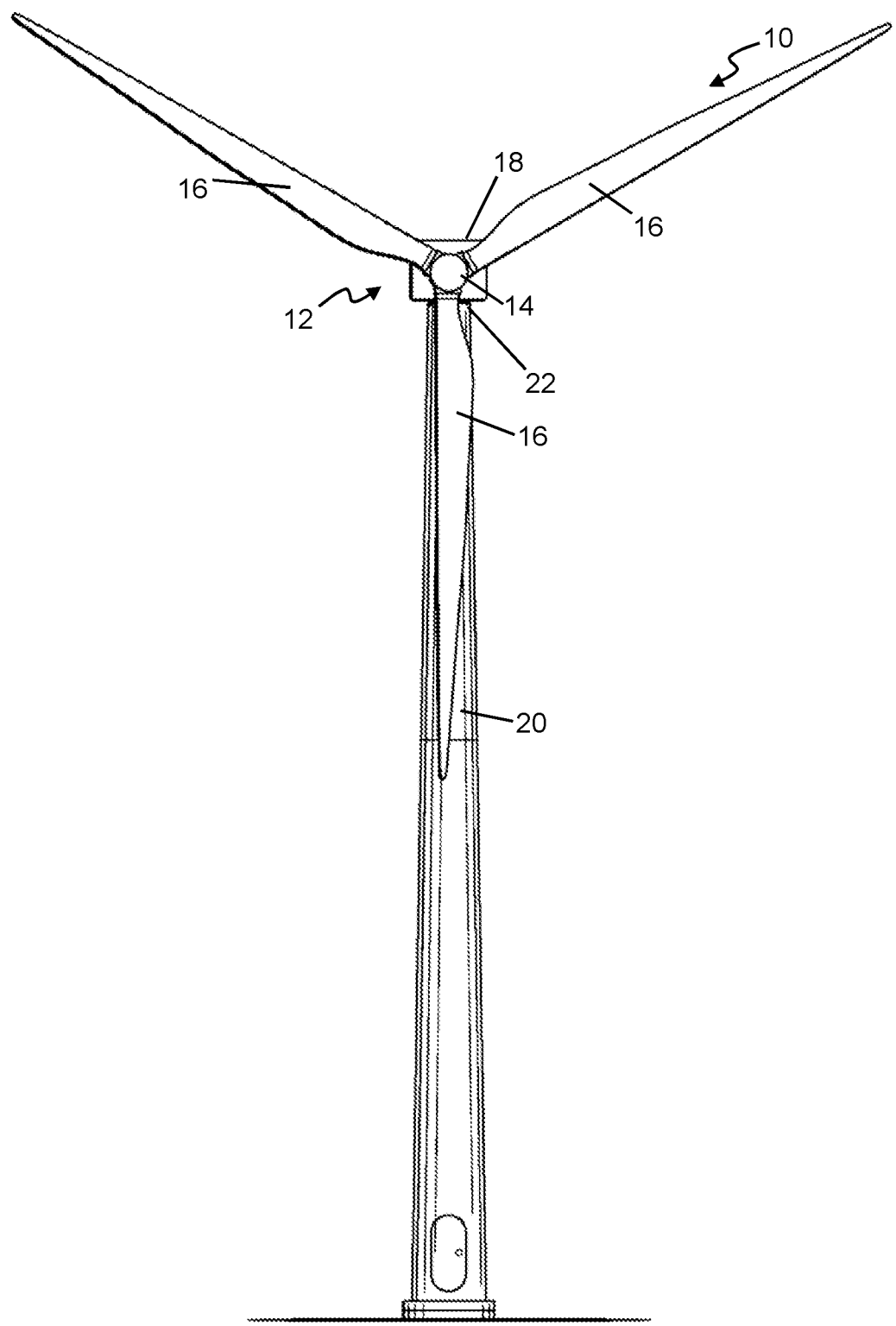
FIG. 1 is a front view of a wind turbine within which the embodiments of the invention may be incorporated.

In order to place the embodiments of the invention in a suitable context, reference will firstly be made to FIG. 1. Here, a wind turbine 10 according to one embodiment of the invention comprises a rotor 12 including a hub 14 to which is attached three wind turbine blades 16. Here, the wind turbine 10 is a known type of turbine referred to as a horizontal axis wind turbine or 'HAWT'. HAWTs are the most common type of wind turbine in use today, particularly for utility-scale applications above 1 MW, for example. Moreover, although three blades is a common rotor configuration, it is also known to use different number of blades.

The rotor 12 is rotatably supported by a nacelle 18 that is mounted to the top of a tower 20 in the usual way. The nacelle 18 houses and supports various power generating components of the wind turbine 10, which are not shown in detail here. As is known, the flow of wind acting on the blades 16 drives the rotor 12 which in turn drives the power generation equipment housed in the nacelle 18.

Figure 2:
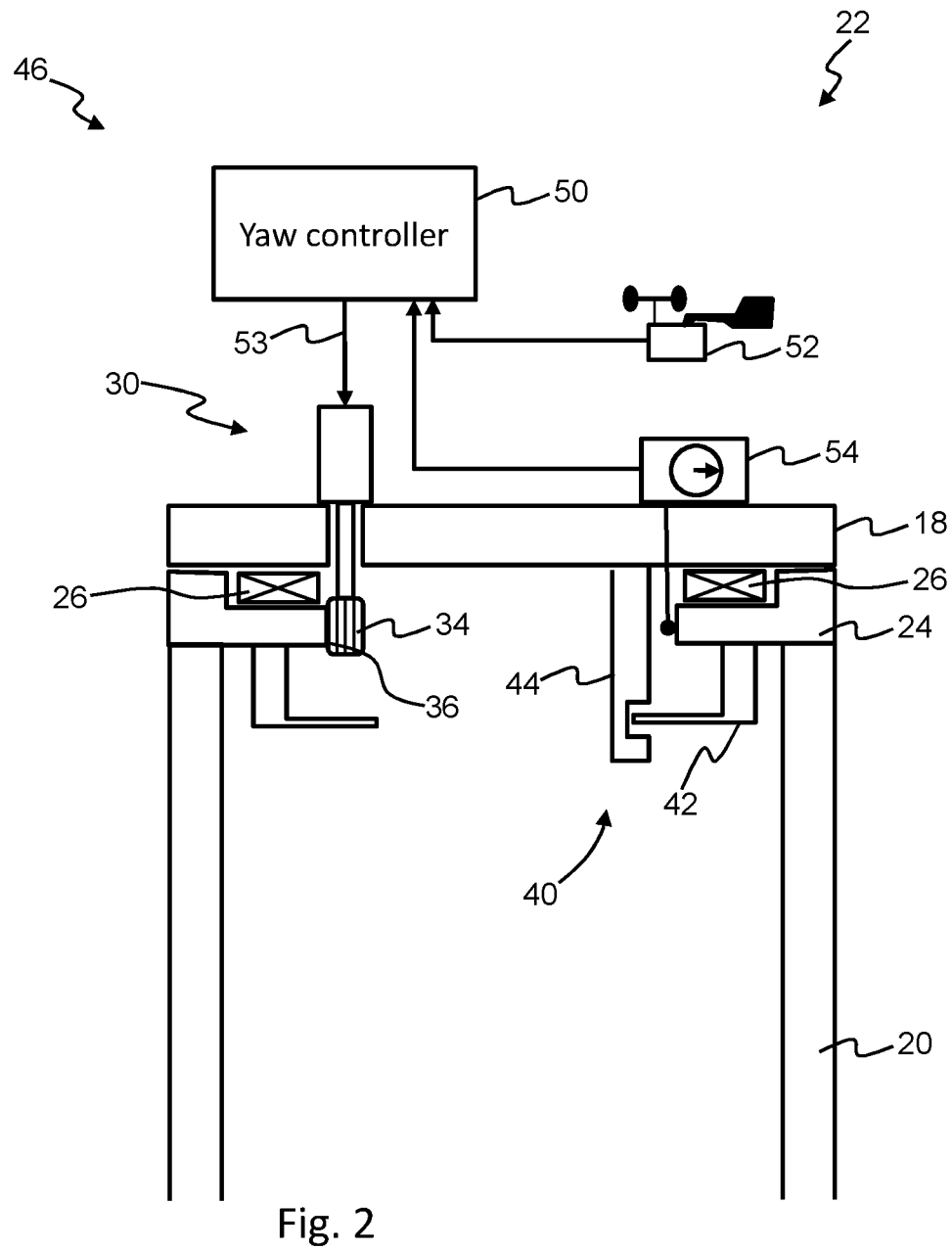
FIG. 2 is a schematic view of a nacelle yaw system of the wind turbine in FIG. 1 including a yaw controller that acts on a suitable yaw actuator.

In a HAWT, it is important that the azimuth or 'yaw' position of the nacelle is able to be controlled. This is so that the nacelle 18 can be aligned with the prevailing wind direction which optimises the capture of energy from the flow of wind by the blades. For this purpose the wind turbine is provided with a yaw system 22. Yaw systems are well known in the art and so a detailed description will not be provided here so as not to obscure the inventive concept. However, a schematic overview of relevant components of a yaw system is shown in FIG. 2 and is described below. It should be noted, however, that the yaw system 22 depicted in FIG. 2 is one way in which a yaw system may be implemented and other examples are also known in the art.

With reference to FIG. 2, the nacelle 18 is rotatably supported on a yaw gear 24 that is itself supported on the uppermost end of the tower 20. For convenience of illustration, the nacelle 18 is shown as a single block in FIG. 2, whereas in reality it would be a much larger structure. The yaw gear 24 comprises a yaw bearing 26 on which the nacelle 18 is mounted so that it is able to rotate with respect to the tower 20. The yaw bearing 26 may be any type of bearing that would be suitable for such a high-load application, for example a gliding yaw bearing or a roller yaw bearing, both of which would be well-known to the skilled person. Note that the exact form of bearing is not the focus of the invention and so will not be described in more detail here.

Rotational movement of the nacelle is driven by one or more yaw drive actuators 30. Only a single actuator is shown here for simplicity, but it is common for several actuators to be provided in order to provide the high levels of torque needed to rotate the mass of the nacelle. The yaw drive actuator 30 may include a motor component 32 that is mounted to the nacelle, for example on a main structural component such as a nacelle bed plate or base frame, and which drives a pinion 34 that is engaged with gear teeth 36 of the yaw gear 24. Although not shown in this schematic view, it should be noted that the yaw drive actuator 30 would include suitable reduction gearing to convert the high speed rotation of the motor component 32 to a low speed rotation of the pinion 34. Typically, the motor component 32 would be an AC machine and the reduction gearing would be such that the nacelle would take several minutes to turn through a full rotation. However, electrically operated actuators are not essential and hydraulic actuators are also known.

The yaw drive actuator 30 may also prevent nacelle rotation by providing a torque counter to the direction in which the nacelle is being urged to rotate, for example due to rotational moments imposed by wind effects. However, such an approach tends to increase the wear on the yaw actuator and so it is common for yaw systems to include a yaw brake 40, as is shown in FIG. 2.

The yaw brake 40 includes a braking surface provided by brake ring or disk 42 associated with the tower 20 and one or more brake calipers 44 associated with the nacelle 18. The brake caliper 44 may act in the usual way to apply a braking force to the brake ring 42 in order to fix the nacelle 18 in position which removes torque from the yaw drive actuator 30. Note that yaw brakes may be hydraulically driven or electrically driven and the technical arrangement of the yaw brake shown in FIG. 2 is one example of the way in which a yaw brake may be implemented. Furthermore, in some yaw systems, a yaw brake may not be necessary.

The yaw system 22 incorporates a yaw control system 46 to provide monitoring and control over the activity of the yaw drive actuator 30. In overview, the yaw control system 46 includes a yaw controller 50 and a wind direction sensor 52. The wind sensor 52 provides a measure of the relative wind direction to the yaw controller 50 and, in turn, the yaw controller 50 provides a control signal 53 to the yaw drive actuator 30. Typically, the yaw drive actuator will be operable to run at a single speed, so the control signal 53 will thus activate the yaw drive actuator 30 to run at a single speed either clockwise or counter-clockwise, or will deactivate the yaw drive actuator. Note that the yaw controller 50 may be implemented as a dedicated computing unit including the required processing capability, memory and input/output functions or may be implemented as part of a main control unit of the wind turbine. Note also that although single speed yawing is common, it is also possible to have a system which uses more than one yawing speed, and also variable yawing speed depending on operational conditions.

Typically, a yaw control system embodies a feedback control algorithm which determines the difference or error between the absolute wind direction and the azimuth angle of the nacelle ("nacelle heading") and then activates the yaw drive actuator to reduce that detected error. Expressed another way, the control algorithm functions to reduce the relative wind direction substantially to zero degrees. Typically, the yaw drive actuator can either be turned off, or it can be operated at a constant rotational speed in either a clockwise or counter-clockwise direction. Since the wind direction tends to fluctuate, a conventional yaw control algorithm generally processes the relative wind direction signal using a low pass filter with a time constant in the order of several 10s of seconds to avoid over-activation of the yaw drive actuator. However, in some circumstances this can lead to the algorithm being unable to track the wind direction accurately such that an error accumulates between the prevailing wind direction and the nacelle heading, or the algorithm may cause overshoot, i.e. the yawing is stopped after the zero degrees relative wind direction has been passed.

The yaw control system of the invention proposes a solution to this issue by incorporating a predictive functionality which provides the yaw control algorithm with predictive information about the activity of the yaw drive actuator before that activity is reflected in the relative wind direction feedback path due to the inherent delay injected by the low pass filter.

Figure 3:
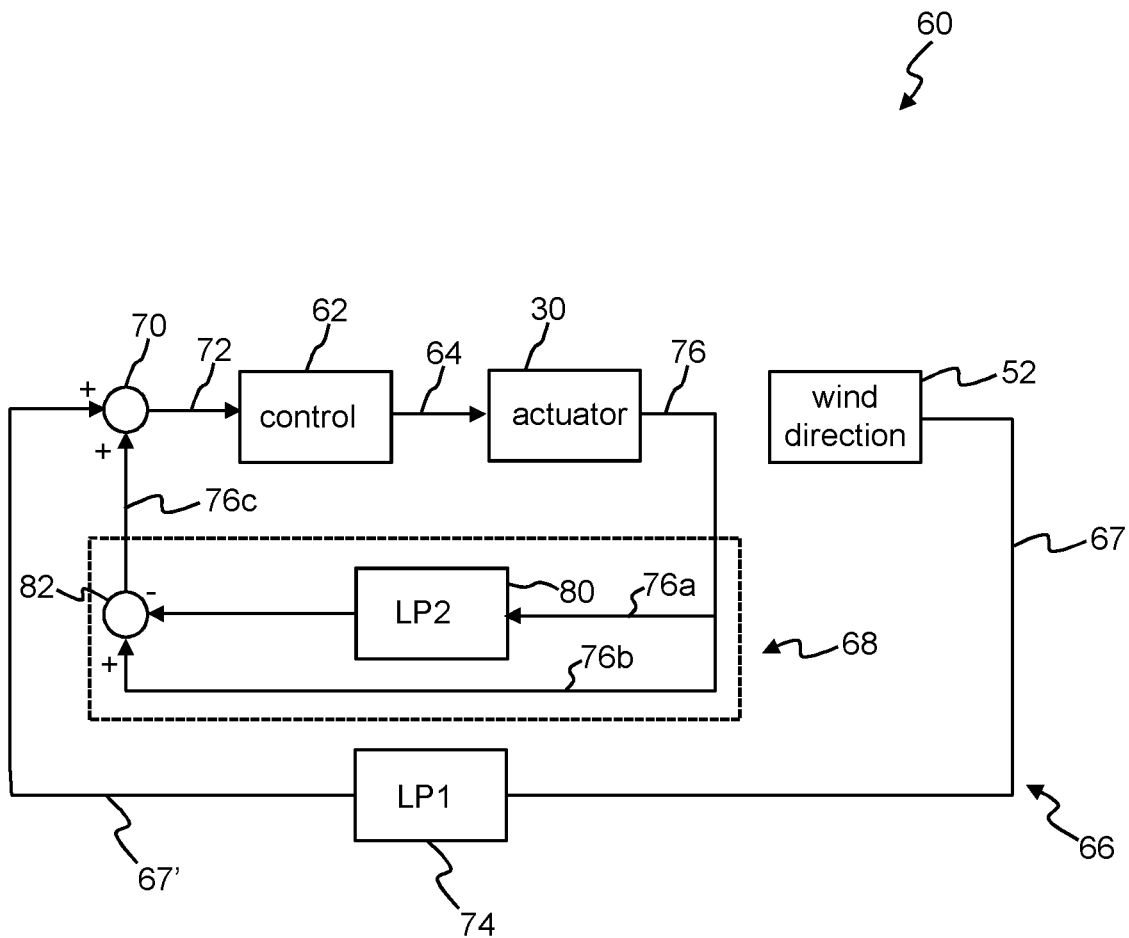
FIG. 3 is a schematic block diagram of an example of an algorithm that may be implemented by the yaw controller of the yaw system of FIG. 2.

FIG. 3 is one example of how such a yaw control algorithm or scheme 60 may be implemented. It should be noted that in this embodiment it is envisaged that the control algorithm is a software implementation that is run on a suitable computing platform provided by the yaw controller. However, it should be noted that it could also be embodied in hardware, although it is considered less likely, currently.

In overview, the yaw control algorithm 60 in this embodiment includes a control module 62 which generates a controller output signal 64 to drive the yaw drive actuator 30, and two control loops:

a first or 'outer' feedback loop 66 which feeds back a measured process variable in the form of a relative wind direction signal 67 from wind sensor 52; and a second or 'inner loop' 68 which feeds back information relating to the contemporaneous activity of the yaw drive actuator 30 via feedback signal 76. By 'contemporaneous', it is meant that information is fed back about how the yaw drive actuator is operating in real time, whether that information is the specific position of the actuator at a certain point in time or information derived therefrom. However, that information is substantially unaffected by system disturbances such as deadtime or filtering delay. In this context, it should be appreciated that a small delay may be acceptable. For example, if yaw speed is 0.5 deg/s, then a delay of one second in the feedback signal may only give rise to a 0.5 degree overshoot, assuming constant wind conditions. So a delay of a few seconds may be acceptable, although a delay of several 10s of seconds would be less so. The term 'contemporaneous' should therefore be interpreted accordingly and should not be considered to require instantaneous feedback of the actuator activity.

The information from the two feedback loops 66,68 are combined at a summing junction 70 to generate an input signal 72 to the control module 62.

Note that the control law implemented in the control module 62 may be a simple hysteresis controller using positive and negative yaw error limits (i.e. relative wind direction thresholds) for starting yaw activation and a zero value 0 as the stopping criteria. However, it is envisaged that a more sophisticated control law may be preferred in some applications, for example including Proportional, Derivative and Integral control law components as would be well known to the skilled person.

Referring now to the first control loop 66, the wind direction signal 67 is filtered by a first low pass filter 74, as is conventional. To avoid the negative effects of a rapidly fluctuating wind direction, the filter typically has a time constant in the order of 100 seconds, for example between 80 and 110 seconds. It should be noted that this particular value of time constant is exemplary only and is not intended to be limiting.

Referring to the second control loop 68, the feedback signal 76 is indicative of the yaw position of the nacelle, for example the nacelle heading with reference to a datum position. The yaw drive actuator may be monitored directly to generate the feedback signal 76, or that signal may be generated by another technique, for example by a yaw heading sensor associated with the yaw gear, as shown in FIG. 2. Still further, the feedback signal may be generated by a model, as will be described later.

The feedback signal 76 is then split into two feedback signal components: 76a and 76b. The purpose of the two feedback signal components is to generate a composite signal that provides information about the angular movement of the nacelle which has not yet been picked up, reflected, or sensed, by the wind direction signal 67 due to the inherent delay in that signal due to the low pass filtering. More specifically, the first signal component 76a may represent the yaw heading of the nacelle, whereas the second signal component is a filtered value of the yaw heading of the nacelle, being filtered by a second low pass filter 80. In order to factor in the behaviours of the first low pass filter 74, the second low pass filter 80 has a time constant the same as the first low pass filter 74. As mentioned above suitable values for the time constant in this technical application of the technology is between 80 and 110 seconds, and particularly 100 seconds.

The first signal component 76a and the second signal component 76b are combined at summing junction 82 which determines the difference between the two signals. Therefore, the output signal 76c from the summing junction 82 is equal to the nacelle yaw heading minus a delayed value, and so represents the amount of change of the nacelle yaw heading that is not yet reflected in the filtered wind direction signal 67'. In other words, the output signal 76c can be considered to be an indication or prediction of what the process variable (i.e. relative wind direction) would look like without the deadtime associated with the filtering of the feedback loop and so provides an indication of the contemporaneous activity of the yaw drive actuator.

So, at summing junction 70, the nacelle heading output signal 76c is added to the filtered relative wind direction signal 67'. This compensates for the amount that the nacelle has yawed but which takes a period of time, in this example 100 seconds, to appear in the relative wind direction signal 67'. The output of the summing junction 70 is a controller input signal 84 which therefore drives the activation of the yaw drive actuator 30.

A benefit of the algorithm described above is that the inner feedback loop 68 compensates for the delay imposed on the relative wind direction feedback signal by the first low pass filter 74 which therefore guards against overshoot and accumulative error in the nacelle heading.

In the example discussed above, the activity of the yaw drive actuator 30 is monitored directly, either through instrumenting the actuator itself, or from a monitoring system associated with the yaw gear, for example a yaw gear position sensor 54 as shown in FIG. 2. However, it will be appreciated that such monitoring equipment adds cost and complexity to the overall wind turbine system. An alternative approach is illustrated in a second control algorithm 90 shown in FIG. 4.

Figure 4:
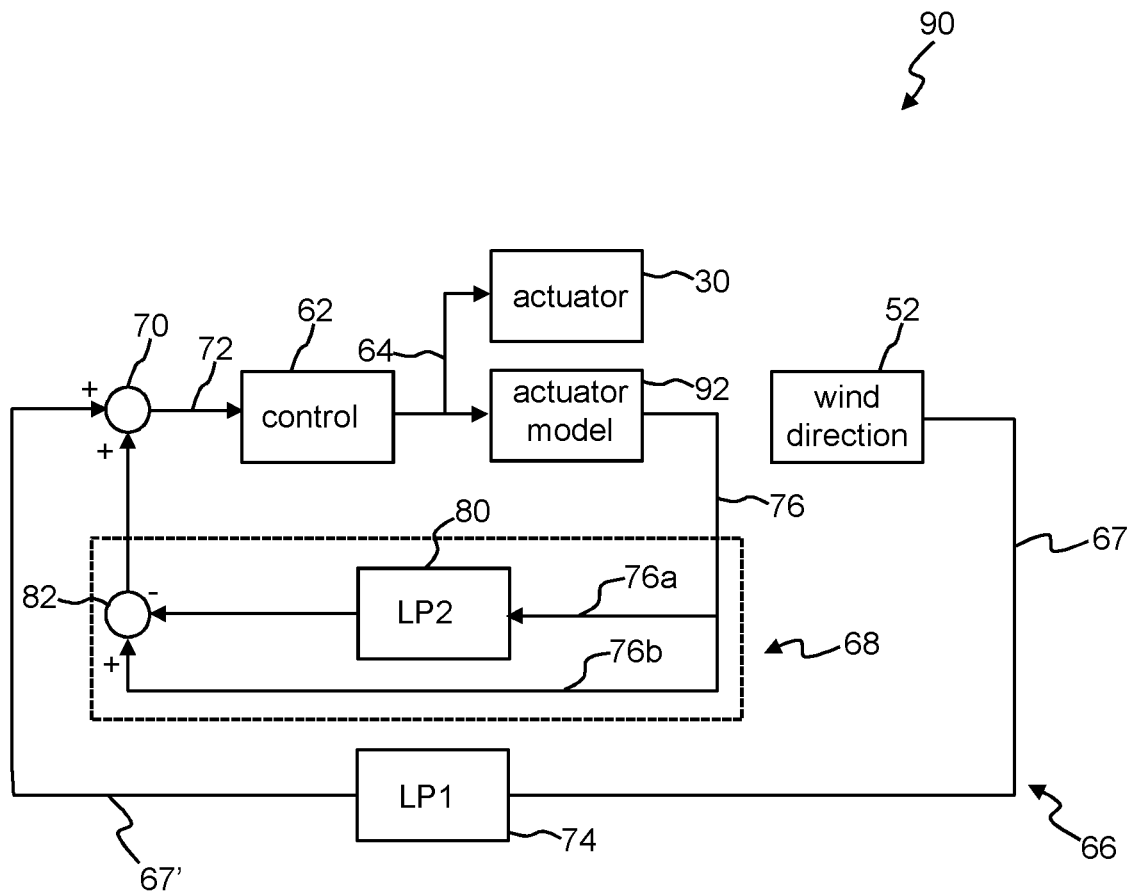
FIG. 4 is a schematic block diagram of another example of an algorithm that may be implemented by the yaw controller of the yaw system in FIG. 2.

It will be noted that the control algorithm 90 of FIG. 4, is very similar to the control algorithm depicted in FIG. 3. Therefore in this discussion the focus will be on the differences between the two approaches and it can be assumed that the other components are the same as the control algorithm of the FIG. 3 arrangement.

In the FIG. 4 arrangement, no actual monitoring of the activity of the yaw drive actuator 30 takes place. Instead, the algorithm 90 includes an actuator model 92 in addition to the yaw drive actuator 30. The actuator model 92 receives the same control signal as the yaw drive actuator 30 and generates the feedback signal 76 as in the previous arrangement. Note that the operational characteristics of the yaw drive actuator 30 are well understood and relatively simple, and so one example of the model may be an integrator which uses the known yaw speed of the nacelle, for example in degrees per minute, multiplied by the output of the controller, which in this case is simply +1, −1 or 0 depending on whether the yaw system is deactivated, activated and rotating the nacelle in a clockwise direction or activated and rotating the nacelle in a counter-clockwise direction.

In the same way as the previous embodiment, the inner feedback loop 68 provides an estimate or prediction of what the process variable, i.e. the relative wind direction signal 67, would look like without any system disturbance which in this case is the delay imposed by the first low pass filter 74. The actuator model 92 and the inner feedback loop 68 can therefore be considered to act on the output of the control module 62 in a way that intentionally ignores the effects of the low pass filtering of the relative wind direction signal 67 that occurs in the outer feedback loop 66. This estimate or prediction can then be applied to compensate for the signal delay by adding the signal to the delayed feedback signal 67'.

Figure 5:
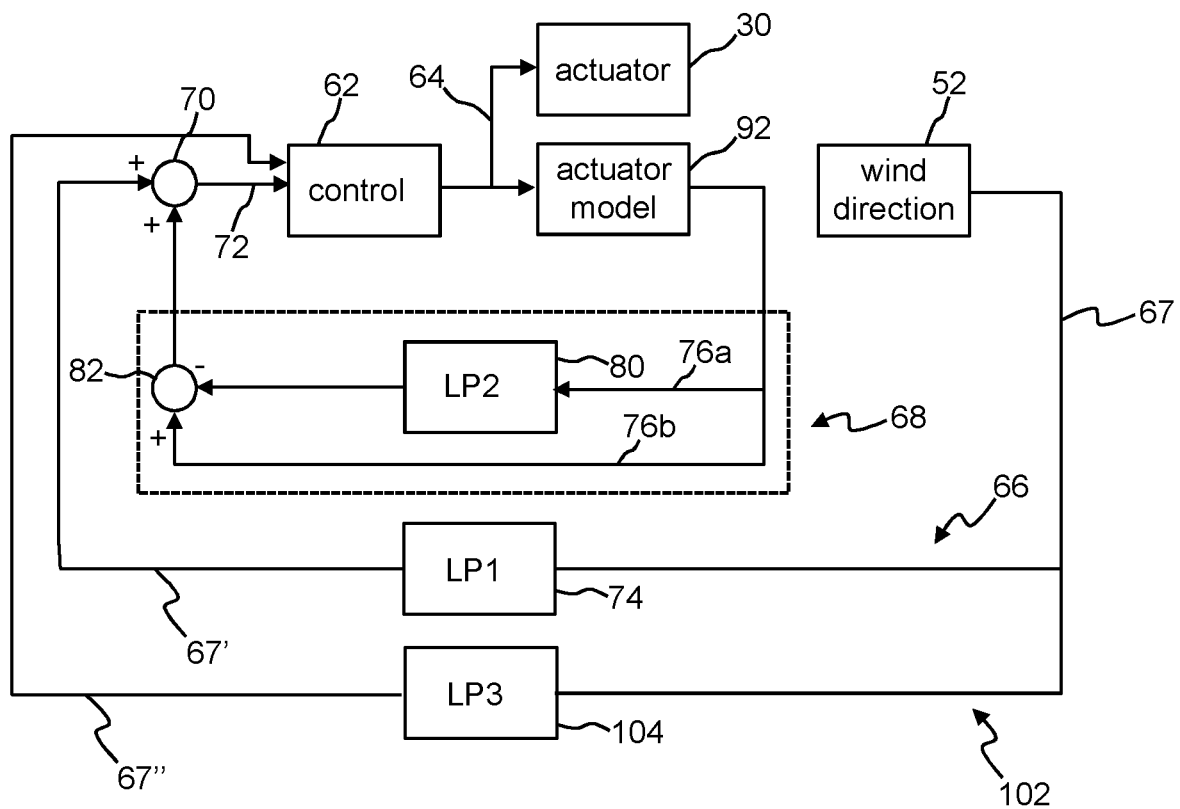
FIG. 5 a schematic block diagram of another example of an algorithm that may be implemented by the yaw controller of the yaw system in FIG. 2.

A further embodiment of a control algorithm 100 is shown in FIG. 5. Note that this embodiment of control algorithm is based on the embodiments discussed above and so the same components will be referred to using the same reference numerals. Furthermore, only the differences will be described.

In the embodiment of FIG. 5, a third feedback loop 102 is provided. In essence, the first third feedback loop 102 governs the activation of the yaw drive actuator 30 by the control module 62, whilst the first and second feedback loops 66, 68 govern the deactivation of the yaw drive actuator 30 by the control module 62.

The third feedback loop 102 acts on the relative wind direction feedback signal 67, feeds that signal through a low pass filter 104 to result in output signal 67", which is then input directly into the control module 62. Since the third feedback loop 102 governs the activation of the yaw drive actuator 30 by the control module 62, the low pass filter 104 has a slow time constant, as in previous embodiments, between 80 and 110 seconds, for example 90-100 seconds. This ensures that the control module 62 does not activate the yaw drive actuator 30 unnecessarily due to transient wind direction changes. Thus the hysteresis control implemented by the control module 62 initiates a yawing action (either clockwise or counter clockwise) when the feedback signal 67" exceeds specified limits in the relative wind direction signal (i.e. yaw error).

Once the yaw drive actuator 30 is active, the control module 62 disregards, or switches to, the feedback signal 67" and instead monitors input signal 72 generated by the first and second feedback loops 66,68.

In this embodiment, the first low pass filter 74 and the second low pass filter 80 are implemented with a faster time constant, which may be approximately 10 seconds for example. The time constants of the first and second filters may be between 5% and 20% of the time constant of the further filter. For example, the time constant of the further filter may be between 80 and 100 seconds, and the time constant of the first filter may be between 5 and 20 seconds. In this specific embodiment, the fast time constants of the filters 74,80 are 10% of the value of the slow time constant of filter 104. The time to 10 seconds is provided here as an example, and should not be considered limiting. The slower time constant of the filter 104 is selected to limit frequent activation while the faster time constant of the filters 74,80 are selected as a compromise between robustness towards modelling errors (which would suggest a shorter time constant is more appropriate) and the risk of too early stopping of the yaw activation due to spikes in the feedback signal.

Since the first and second feedback loops 66,68 are implemented with a faster time constant, this implementation means that the accuracy of the input signal 72 is less sensitive to small errors in the speed of the yaw drive actuator. This is the particularly the case where the yaw speed feedback signal is provided by a model, which may have a small modelling error. A faster time constant means that the modelling error is integrated over a smaller time period.

Having described above specific embodiment of the inventive concept, the skilled person would appreciate that various modifications could be made to those embodiments without departing form the inventive concept, as defined by the claims.

The invention claimed is:

1. A wind turbine including a nacelle mounted on a tower, and a yaw control system that is operable to yaw the nacelle with respect to the tower, the yaw control system comprising:
a controller receiving an input signal, and providing an output control signal to a yaw actuator;
wherein the yaw actuator is operable to yaw the nacelle in response to the output control signal received from the controller;
wherein the input signal to the controller is based on:
a first feedback signal that is indicative of a relative wind direction determined with respect to the wind turbine, wherein the first feedback signal is filtered with a first low pass filter; and
a second feedback signal that is indicative of activity of the yaw actuator, wherein the second feedback signal provides an indication of a yaw heading of the nacelle, as driven by the yaw actuator, that is not yet indicated in the in the first feedback signal due to the filtering of the first feedback signal by the first low pass filter and, wherein the second feedback signal is based on a first signal component and a second signal component, wherein the first signal component represents the yaw heading of the nacelle and the second signal component is a filtered value of the yaw heading of the nacelle, the second signal component being filtered by a second filter.

2. The wind turbine of claim 1, wherein the second filter is a low pass filter.

3. The wind turbine of claim 1, wherein the first low pass filter and the second filter have substantially equal time constants.

4. The wind turbine of any one of claim 1, wherein the controller receives a second input signal that is indicative of a relative wind direction determined with respect to the nacelle, wherein the second input signal is filtered by a further filter.

5. The wind turbine of claim 4, wherein the further filter has a time constant that is different from the time constant of the first low pass filter.

6. The wind turbine of claim 5, wherein time constants of the first low pass filter and the second filter are between 5% and 20% of the time constant of the further filter.

7. The wind turbine of claim 6, wherein the time constant of the further filter is between 80 and 100 seconds, and the time constant of the first low pass filter is between 5 and 20 seconds.

8. The wind turbine of claim 1, wherein the first low pass filter has a time constant of between 80 and 110 seconds, preferably between 90 and 100 seconds.

9. The wind turbine of claim 1, wherein the second filter has a time constant of between 80 and 110 seconds.

10. The wind turbine of claim 1, wherein the second feedback signal is generated by a yaw actuator model.

11. The wind turbine of claim 10, wherein the yaw actuator model provides a signal that is indicative of the yaw heading of the nacelle.

12. The wind turbine of claim 11, wherein the yaw actuator model is implemented as an integration function based on a predetermined yaw speed value.

13. A control method for a wind turbine including a nacelle mounted on a tower, and a yaw system including a yaw actuator that is operable to yaw the nacelle with respect to the tower, the method comprising:
controlling the yaw actuator based on a first feedback signal, the first feedback signal being a low-pass filtered signal indicative of relative wind direction, and a second feedback signal, the second feedback signal being indicative of activity of the yaw actuator;
wherein the second feedback signal provides an indication of a yaw heading of the nacelle, as driven by the yaw actuator, that is not yet indicated in the in the first feedback signal due to the filtering of the first feedback signal by a low pass filter and,
wherein the second feedback signal is based on a first signal component and a second signal component, wherein the first signal component represents the yaw heading of the nacelle and the second signal component is a filtered value of the yaw heading of the nacelle, the second signal component being filtered by a second filter.

14. A controller for a wind turbine system including a nacelle mounted on a tower, a yaw system including a yaw actuator that is operable to yaw the nacelle with respect to the tower, a rotor having a plurality of blades, wherein the controller includes a processor, a memory module, and an input/output system, and wherein the memory module includes a set of program code instructions which when executed by the processor, implements an operation, comprising:
controlling the yaw actuator based on a first feedback signal, the first feedback signal being a low-pass filtered signal indicative of relative wind direction, and a second feedback signal, the second feedback signal being indicative of activity of the yaw actuator;
wherein the second feedback signal provides an indication of a yaw heading of the nacelle, as driven by the yaw actuator, that is not yet indicated in the first feedback signal due to the filtering of the first feedback signal by a low pass filter and,
wherein the second feedback signal is based on a first signal component and a second signal component, wherein the first signal component represents the yaw heading of the nacelle and the second signal component is a filtered value of the yaw heading of the nacelle, the second signal component being filtered by a second filter.

15. The controller of claim 14, wherein the second filter is a low pass filter.

16. The controller of claim 14, wherein the low pass filter and the second filter have substantially equal time constants.

17. The controller of claim 14, wherein the controller receives a second input signal that is indicative of a relative wind direction determined with respect to the nacelle, wherein the second input signal is filtered by a further filter.

18. The controller of claim 17, wherein the further filter has a time constant that is different from the time constant of the low pass filter.

* * * * *